Dec. 13, 1932.     A. SCHOENINGER     1,891,056

ORNAMENTAL CHAIN CONSTRUCTION

Filed May 23, 1932

Inventor
Adolf Schoeninger
By Nathaniel Frucht
his Attorney

Patented Dec. 13, 1932

1,891,056

UNITED STATES PATENT OFFICE

ADOLF SCHOENINGER, OF GLEN RIDGE, NEW JERSEY, ASSIGNOR TO FORSTNER CHAIN CORPORATION, A CORPORATION OF NEW JERSEY

ORNAMENTAL CHAIN CONSTRUCTION

Application filed May 23, 1932. Serial No. 612,995.

My present invention relates to the manufacture of chains, and has particular reference to chains and the like suitable for ornamental use.

It has been found desirable to manufacture an ornamental link chain that appears to be made of many separate ornaments, but which may be inexpensively manufactured and assembled. The principal object of my invention is to provide a link chain which produces the visual effect of a construction formed of many separate ornaments.

To further reduce manufacturing expense, it has been found feasible to devise a construction that eliminates the use of connecting links, and that does not require soldering of the links. Further objects of my invention are therefore to provide a link chain structure in which the links are hingedly joined together without the use of connecting links or soldering of the links and in which the links cannot be accidentally separated in the course of ordinary use and handling.

With the above and other advantageous features in view, the invention consists of a novel arrangement of parts more fully disclosed in the detailed description following, in conjunction with the accompanying drawing, and more particularly defined in the claims appended hereto.

Figure 1:
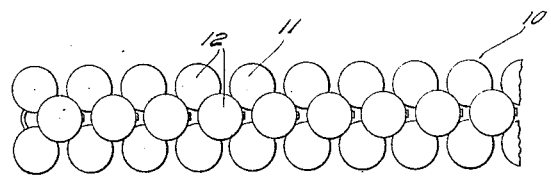
Fig. 1 is a plan view of a section of ornamental link chain embodying the principles of my invention.

Referring to the drawing, the novel link chain 10 is composed of a series of adjacent links 11, each link having a plurality of sections 12 which simulate ornaments; the present embodiment discloses the ornaments 12 in the form of spherical segments, whereby the chain as a whole appears to be made up of overlapping beads or buttons, but the sections may simulate other ornaments, which may be similar or different, as desired.

Figure 4:
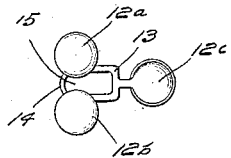
Fig. 4 is a plan view of a link blank, prior to assembly.

As shown in Fig. 4, the links forming the link chain as illustrated are stamped out of sheet metal, and the blank comprises two adjacent ornaments 12a, 12b and one rear ornament 12c, the latter being joined to the ornaments 12a and 12b by a stem and yoke connection 13, and the two ornaments 12a and 12b being joined together by a connecting arm 14, which is preferably of arcuate formation. If the ornaments 12a, 12b are recessed or indented, the rear ornament 12c is reversely recessed or indented, as the rear ornament is bent over in assembly.

Figure 2:
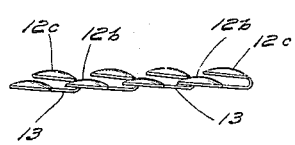
Fig. 2 is a side view of a plurality of joined links.
Figure 3:
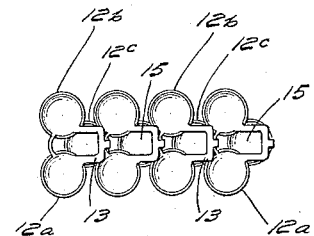
Fig. 3 is a bottom plan view of a chain portion.
Figure 5:
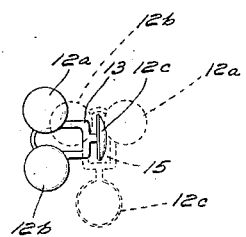
Fig. 5 is an explanatory view showing the necessary relation between adjacent links for assembling the chain.

In assembling the chain the rear ornament 12c is bent upwardly on its yoke stem and is passed through the space 15 formed by the front ornaments 12a, 12b, the arm 14 and the yoke 13 of another link, and is then bent down to overlap the ornaments 12a and 12b, thus assuming the appearance indicated in Fig. 2. The ornament 12c is preferably large enough to prevent removal through the opening 15 unless bent over, and the chain is thus formed of links which are hingedly connected together, but which cannot be separated unless one of the ornaments 12c is intentionally bent upwardly and turned in the position shown in Fig. 5, whereupon the bent ornament 12c may be passed through the adjacent link to separate the links.

Although the drawing shows the ornaments as of the same size and the same general appearance, the ornaments may be of different forms and shapes, both in the same links and in different links, as the specific configurations of the ornaments are designed to appeal to the eye of the purchaser. It is preferable, however, to so design the ornaments that they conceal the link connections, as indicated in Fig. 1, and to design the central opening 15 so that central ornament 12c must be bent upwardly and turned in relation to the central opening to either assemble or separate the links.

While the body portion has been illustrated as having two ornaments positioned adjacent each other, a third ornament being secured to the body portion by a connection and bendable to position the third ornament in a plane parallel to the plane of the first two ornaments, the body portion may be so designed as to provide one ornament or a plurality of ornaments, or each of the adjacent ornaments may be designed to simulate a plurality of ornaments; similarly, the third ornament may be designed to simulate one or more separate ornaments, and may be designed so as to occupy a different relative position with respect to the ornaments of the body portion.

The above construction provides a very ornamental chain composed of individual links which may be stamped out of sheet chain material and readily assembled, the completed chain producing the effect of an ornamental chain made up of many separate ornaments. The separate links may be made of any material, but malleable metal is preferred, as the yoke stem must be bent to assemble the links.

While I have described a specific constructional embodiment of my invention, such changes in the size of the parts, in their form, and in their relative arrangement, may be made as appear desirable to produce different attractive chain effects, within the spirit and the scope of the invention as defined in the appended claims.

I claim:

1. In an ornamental chain, a plurality of links, the body portion of each link having an elongated opening, each link having an imperforate element of a width greater than the link opening width and of a length less than the link opening length and bendable to a plane perpendicular to the general plane of the link, each said element being capable of being passed through the link opening of the adjacent link when in said perpendicular position and bent towards the plane of the link body portion to lock the links together.

2. In an ornamental chain, a plurality of links hingedly connected together, the body portion of each link having an elongated opening, each link having two ornaments positioned adjacent each other and a third ornament connected to the body portion and positioned above the body portion and bendable to a plane perpendicular to the general plane of the link, said third ornament having a width greater than the link opening width and a length less than the link opening length, said third ornament being passed through the link opening of the adjacent link when in said perpendicular position and bent toward the plane of the link body portion to lock the links together, said third ornament when bent to locking position being laterally displaced from the line of the first two ornaments to form a triangle therewith, said third ornament having a surface area sufficient to substantially cover the link opening when in locking position.

3. A link stamping for an ornamental chain comprising three ornament blanks, two of said ornament blanks being adjacent and connected by a short bar integral therewith, and the third of said ornament blanks having a stem integral therewith, said stem being joined to said first two ornament blanks by a yoke connection.

4. A link stamping for an ornamental chain comprising three ornament blanks, two of said ornament blanks being adjacent and connected by a short bar integral therewith, and the third of said ornament blanks having a stem integral therewith and being faced opposite to the facing of said first two ornament blanks, said stem being joined to said first two ornament blanks by a yoke connection.

Signed at Irvington in the county of Essex and State of New Jersey this 19th day of May A. D. 1932.

ADOLF SCHOENINGER. [L. S.]